United States Patent
Kim

(10) Patent No.: US 7,058,151 B1
(45) Date of Patent: Jun. 6, 2006

(54) APPARATUS AND METHOD FOR ACHIEVING SYMBOL TIMING AND FREQUENCY SYNCHRONIZATION TO ORTHOGONAL FREQUENCY DIVISION MULTIPLEXING SIGNAL

(75) Inventor: Kwang-Chul Kim, Seoul (KR)

(73) Assignee: Samsung Electronics Co., Ltd., Kyungki-do (KR)

( * ) Notice: Subject to any disclaimer, the term of this patent is extended or adjusted under 35 U.S.C. 154(b) by 976 days.

(21) Appl. No.: 10/009,772

(22) PCT Filed: Jun. 15, 2000

(86) PCT No.: PCT/KR00/00633

§ 371 (c)(1),
(2), (4) Date: Mar. 18, 2002

(87) PCT Pub. No.: WO00/77961

PCT Pub. Date: Dec. 21, 2000

(30) Foreign Application Priority Data

Jun. 15, 1999  (KR) ................................ 1999-22297

(51) Int. Cl.
*H04L 7/00*  (2006.01)
(52) U.S. Cl. .................. 375/355; 370/207; 370/208; 370/209; 370/350; 375/343
(58) Field of Classification Search ............... 375/355, 375/357, 343; 370/207, 208, 209, 350, 210
See application file for complete search history.

(56) References Cited

U.S. PATENT DOCUMENTS

| | | | | |
|---|---|---|---|---|
| 5,444,697 A | * | 8/1995 | Leung et al. ............... | 370/207 |
| 5,732,113 A | * | 3/1998 | Schmidl et al. ............. | 375/355 |
| 5,991,289 A | * | 11/1999 | Huang et al. ............... | 370/350 |
| 6,314,083 B1 | * | 11/2001 | Kishimoto et al. ......... | 370/210 |
| 6,421,401 B1 | * | 7/2002 | Palin ........................... | 375/343 |
| 6,539,063 B1 | * | 3/2003 | Peyla et al. ................. | 375/267 |
| 6,731,594 B1 | * | 5/2004 | Bohnke ....................... | 370/208 |

FOREIGN PATENT DOCUMENTS

EP      0 915 597 A1    5/1999

OTHER PUBLICATIONS

T. Keller, et al., "Orthogonal Frequency Division Multiplex Synchronisation Techniques for Wireless Local Area Networks", IEEE International Symposium on Personal Indoor and Mobile Radio Communications, Taipei, Taiwan, vol. 3, Oct. 15, 1996, pp. 963-967, XP002063294.
T. Schmidl, et al, "Robust Frequency and Timing Synchronization for OFDM", IEEE Transactions on Communications, IEEE Inc., New York, US, vol. 45, No. 12, Dec. 1, 1997, pp. 1613-1621.
B. Stantchev, et al., "Burst Synchronization for OFDM-based cellular systems with separate signaling channel", Vehicular Technology Conference, 1998. VTC 98. 48th IEEE Ottawa, ONT., Canada, May 18-21, 1998, New York , NY USA, IEEE, US, May 18, 1998, pp. 758-762, XP010288089.
F. Classen, et al., "Synchronization Algorithms for an OFDM System for Mobile Communication" Codierung Fur Quelle, Kanal UND Ubertragung. Vortrage Der ITG-Fachtagung, Munchen, Oct. 26-28, 1994, ITG Fachberichte, Berlin, VDE Verlag, DE, vol. NR. 130, 1994, pp. 105-113, XP000503783.
D. Lee, et al., "A New Symbol Timing Recovery Algorithm for OFDM Systems", IEEE Transactions on Consumer Electronics, IEEE Inc. New York, US, vol. 43, No. 3, Aug. 1, 1997, pp. 767-774, XP000742560.

* cited by examiner

*Primary Examiner*—Hassan Kizou
*Assistant Examiner*—Albert T. Chou
(74) *Attorney, Agent, or Firm*—Sughrue Mion, PLLC

(57)  ABSTRACT

A frequency and symbol timing synchronization apparatus for orthogonal frequency division multiplexed (OFDM)

signals, and a method performed by the apparatus are provided. This apparatus includes an autocorrelation unit, a comparator, a peak flat detector, a frequency offset estimator, a frequency offset compensation unit, a cross correlation unit and a symbol timing synchronization unit. The autocorrelation unit receives data including a synchronizing symbol made up of at least three identical synchronizing signals, delays the received data by a predetermined delay amount, performs autocorrelation between the received data and the delayed data, normalizes an autocorrelated value, and outputs a normalized autocorrelated value. The comparator compares the normalized autocorrelated value with a predetermined threshold value. The peak flat detector detects as a flat section a section where the normalized autocorrelated value is equal to or greater than the threshold value. The frequency offset estimator estimates a frequency offset within the flat section to obtain a frequency offset value. The frequency offset compensation unit compensates for the frequency offset of a received signal using the frequency offset value. The cross correlation unit performs cross correlation using a frequency offset-compensated signal and a reference signal, and normalizes the cross-correlated value to output a normalized cross-correlated value. The symbol timing synchronization unit detects a point where the cross-correlated value is maximum, and performs symbol timing estimation, thereby performing symbol timing synchronization. In the symbol timing and frequency synchronization apparatus and method, accurate frequency synchronization can be achieved because a large sample error can be allowed. Also, a symbol timing error can be reduced since symbol timing synchronization is achieved using a frequency offset-compensated signal.

14 Claims, 5 Drawing Sheets

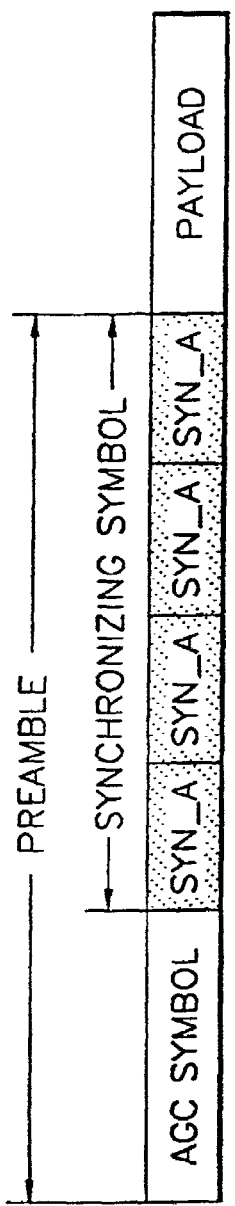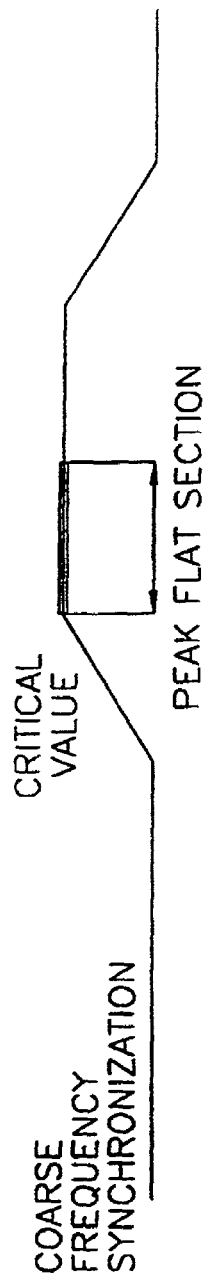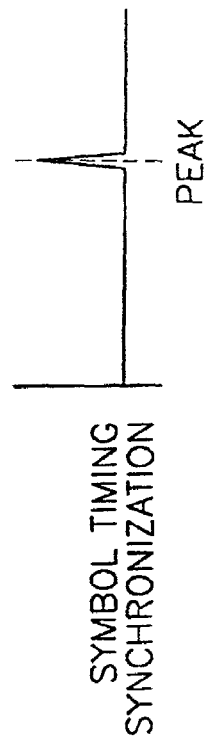
FIG. 4A
FIG. 4B
FIG. 4C

APPARATUS AND METHOD FOR ACHIEVING SYMBOL TIMING AND FREQUENCY SYNCHRONIZATION TO ORTHOGONAL FREQUENCY DIVISION MULTIPLEXING SIGNAL

TECHNICAL FIELD

The present invention relates to an apparatus and method for achieving symbol timing and frequency synchronization, and more particularly, to an apparatus and method for synchronizing symbol timing and frequency in an orthogonal frequency division multiplexing (OFDM) system. OFDM techniques have been adopted as a standard with respect to a physical layer in 802.11a of IEEE or HIPERLAN TYPE 2 of BRAN ETSI, which are the standards of a wideband wireless LAN. The present invention relates to a frequency synchronization apparatus and method which is suitable for this broad-band wireless LAN.

BACKGROUND ART

A conventional OFDM timing and frequency synchronization method is disclosed in U.S. Pat. No. 5,732,113, issued to Timothy M. Schmidl and Donald C. Cox, entitled "Timing and frequency synchronization of OFDM signals". FIG. 1A is a block diagram of the structure of a conventional timing and frequency synchronization apparatus disclosed in the above-described patent, and FIG. 1B is a view for illustrating the operation of the apparatus of FIG. 1A.

Referring to FIGS. 1A and 1B, in a conventional timing and frequency synchronization apparatus, a synchronizing symbol having a length of a half symbol is made up of two symbols SYN_A, a symbol SYN_B and a symbol SYN_C. A maximum point is detected by autocorrelating between the synchronizing symbol formed as described above and a delayed symbol. A symbol timing is obtained from the detected maximum point, and decimal multiple frequency offset compensation is performed. Then, an inverse Fourier transformer inverse-Fourier-transforms a received time-domain signal and the compensated received signal into a frequency domain signal. Also, integral-multiple frequency offset compensation is performed using a differential signal obtained by differentially encoding the synchronizing symbols A and B.

However, the above-described conventional method has a problem in that the probability of an error occurring during obtaining symbol timing is high since a variation in the maximum point of an autocorrelation value is great due to the influence of noise in a channel. Also, fine frequency synchronization and coarse frequency synchronization depend on symbol timing synchronization, so that they are sensitive to the influence of symbol timing errors. Furthermore, in the above-described conventional method, a received signal stored in a memory, and a current received signal are both inversely Fourier transformed, which causes complexity.

Meanwhile, a broad-band wireless LAN uses a 20 MHz frequency band and 64 sub-carriers, and a maximum frequency offset is set to be 200 kHz. Thus, a broad-band wireless LAN does not consider a frequency offset which corresponds to an integral multiple of a sub-carrier frequency. However, the conventional frequency and symbol synchronization method of OFDM signals considers an integral-multiple frequency offset, so that it is not efficient.

DISCLOSURE OF THE INVENTION

An objective of the present invention is to provide a frequency and symbol timing synchronization apparatus which can acquire more accurate frequency synchronization and more accurate symbol timing synchronization from an orthogonal frequency division multiplexed (OFDM) signal which has passed through a multi-path channel to which noise is added and which causes distortion of amplitude and phase.

Another objective of the present invention is to provide a frequency and symbol timing synchronization method which is performed in the frequency and symbol timing synchronization apparatus.

The first objective of the present invention is achieved by a frequency and symbol timing synchronization apparatus for achieving frequency synchronization and symbol timing synchronization of an orthogonal frequency division multiplexed (OFDM) signal, the apparatus including an autocorrelation unit, a comparator, a peak flat detector, a frequency offset estimator, a frequency offset compensation unit, a cross correlation unit and a symbol timing synchronization unit. The autocorrelation unit receives data including a synchronizing symbol made up of at least three identical synchronizing signals, delays the received data by a predetermined delay amount, performs autocorrelation between the received data and the delayed data, normalizes an autocorrelated value, and outputs a normalized autocorrelated value. The comparator compares the normalized autocorrelated value with a predetermined threshold value. The peak flat detector detects as a flat section a section where the normalized autocorrelated value is equal to or greater than the threshold value. The frequency offset estimator estimates a frequency offset within the flat section to obtain a frequency offset value. The frequency offset compensation unit compensates for the frequency offset of a received signal using the frequency offset value. The cross correlation unit performs cross correlation using a frequency offset-compensated signal and a reference signal, and normalizes the cross-correlated value to output a normalized cross-correlated value. The symbol timing synchronization unit detects a point where the cross-correlated value is maximum, and performs symbol timing estimation, thereby performing symbol timing synchronization.

It is preferable that the frequency and symbol timing synchronization apparatus further includes a mode selection unit for concluding a frequency synchronization mode and selecting a symbol timing synchronization mode.

Also, preferably, the length of the synchronous signal is equal to or less than the length of an OFDM half-symbol.

It is also preferable that the peak flat detector calculates the difference or ratio of the autocorrelated value and the threshold value and detects as a flat section a section where the difference or ratio is equal to or greater than a predetermined value.

Alternatively, the peak flat detector can detect as a flat section a section of a predetermined sample length after a point where the autocorrelated value is greater than the threshold value.

Also, alternatively, the peak flat detector can include an addition unit for calculating the sum of a predetermined number of samples after a point where the auto-correlated value is greater than or equal to the threshold value; and a flat section detection unit for calculating the difference or ratio of the sum and the threshold value and detecting as a flat section a section where the difference or ratio is greater than or equal to a predetermined value.

The frequency offset estimator can include a frequency offset estimation unit for obtaining frequency offset values by estimating a frequency offset within the section two or more times; and an averaging unit for calculating the average of the obtained frequency offset values to obtain an average frequency offset value.

The second objective of the present invention is achieved by a frequency and symbol timing synchronization method for achieving frequency synchronization and symbol timing synchronization of an orthogonal frequency division multiplexed (OFDM) signal, the method including: (a) organizing a synchronizing symbol with at least three identical synchronous signals; (b) receiving a signal including the synchronizing symbol, delaying the received signal by a predetermined delay amount, performing autocorrelation between the received signal and the delayed signal, normalizing an autocorrelated value, and detecting as a flat section a section where the normalized autocorrelated value is greater than a predetermined threshold value; (c) estimating a frequency offset within the flat section to obtain a frequency offset value; (d) compensating for the frequency offset of the received signal using the frequency offset value; (e) performing symbol timing synchronization using a frequency offset-compensated signal and a reference signal.

BRIEF DESCRIPTION OF THE DRAWINGS

FIGS. 4A, 4B and 4C are views for illustrating the operation of an apparatus for achieving symbol timing and frequency synchronization of OFDM signals according to an embodiment of the present invention.

BEST MODE FOR CARRYING OUT THE INVENTION

Figure 1A:
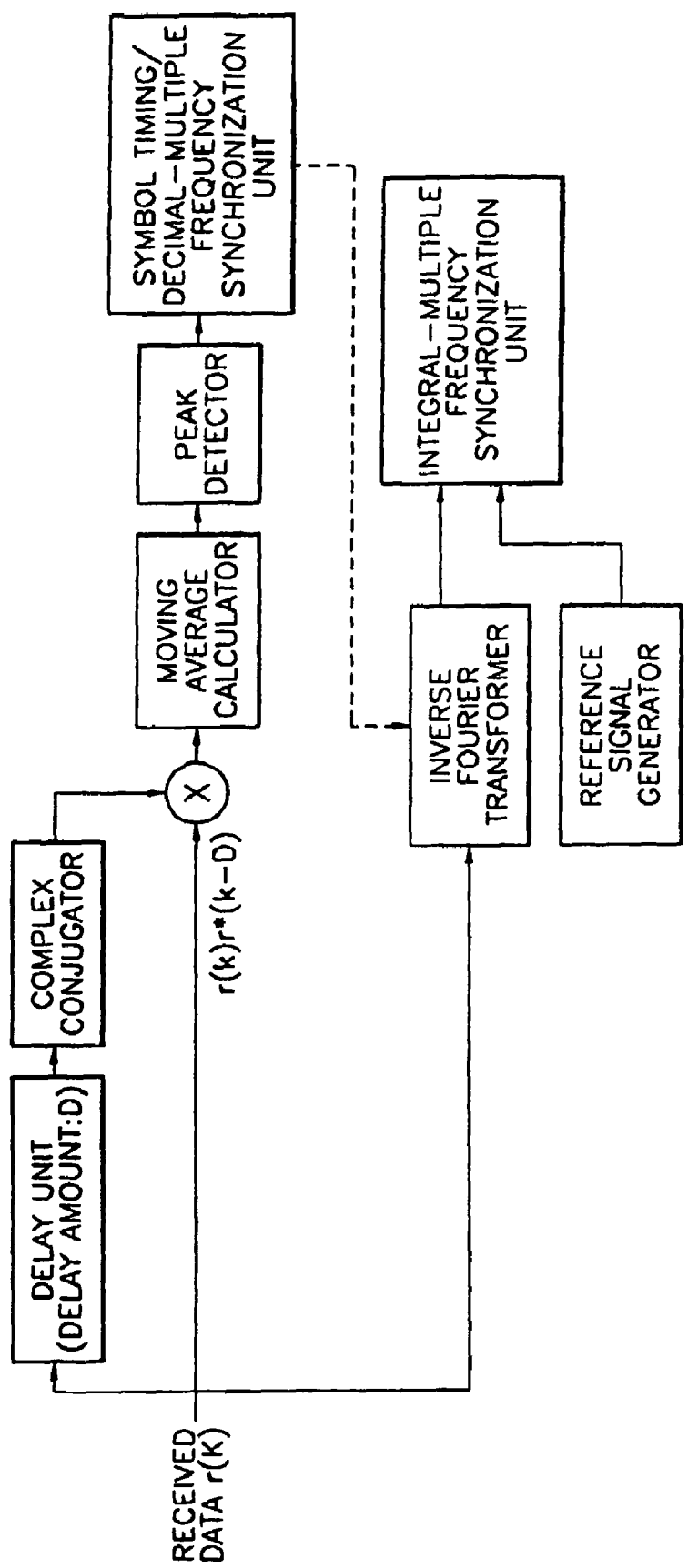
FIG. 1A is a block diagram of a conventional apparatus for achieving symbol timing and frequency synchronization of orthogonal frequency division multiplexed (OFDM) signals.
Figure 1B:
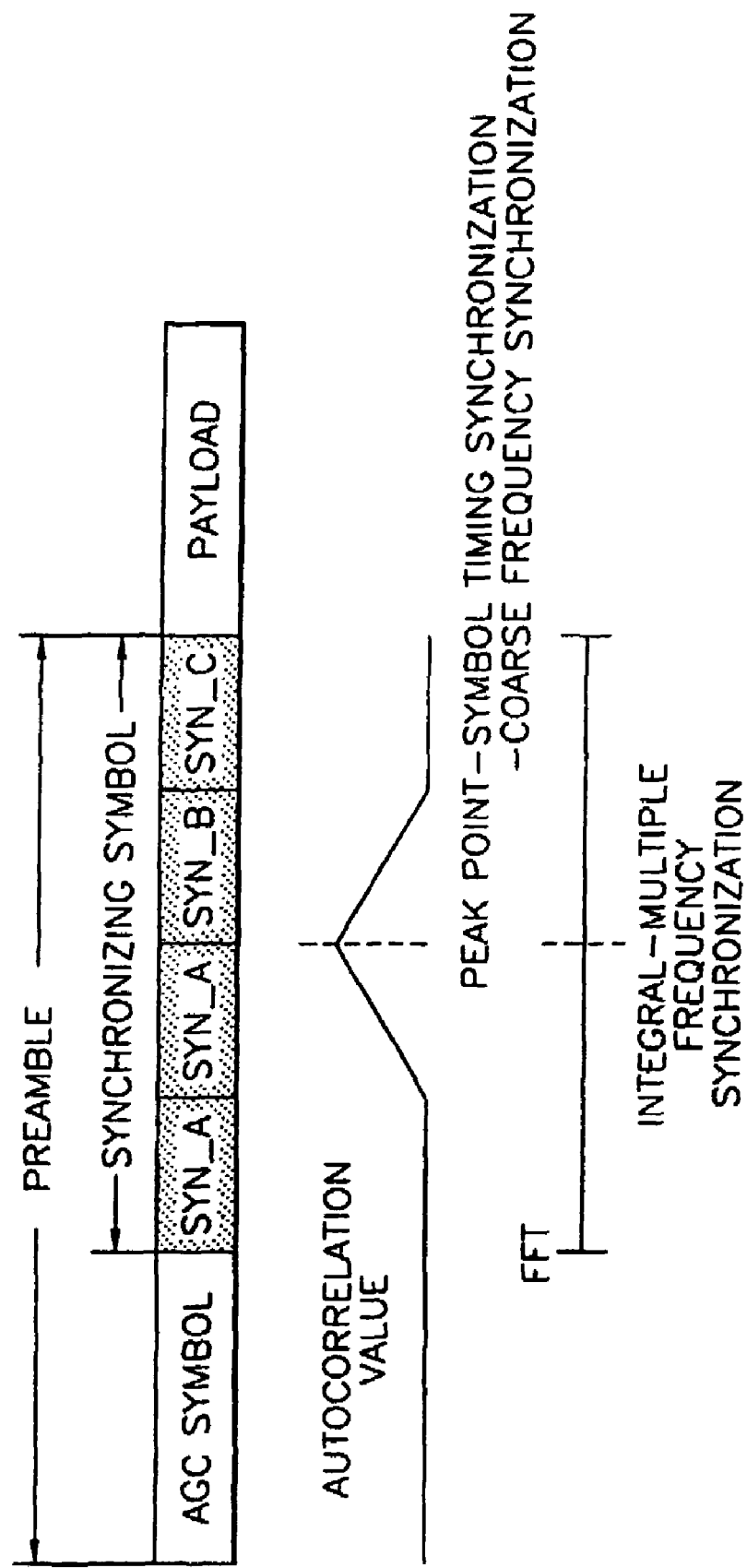
FIG. 1B is a view illustrating a symbol timing and frequency synchronization method which is performed in the symbol timing and frequency synchronization apparatus of FIG. 1A.
Figure 2:
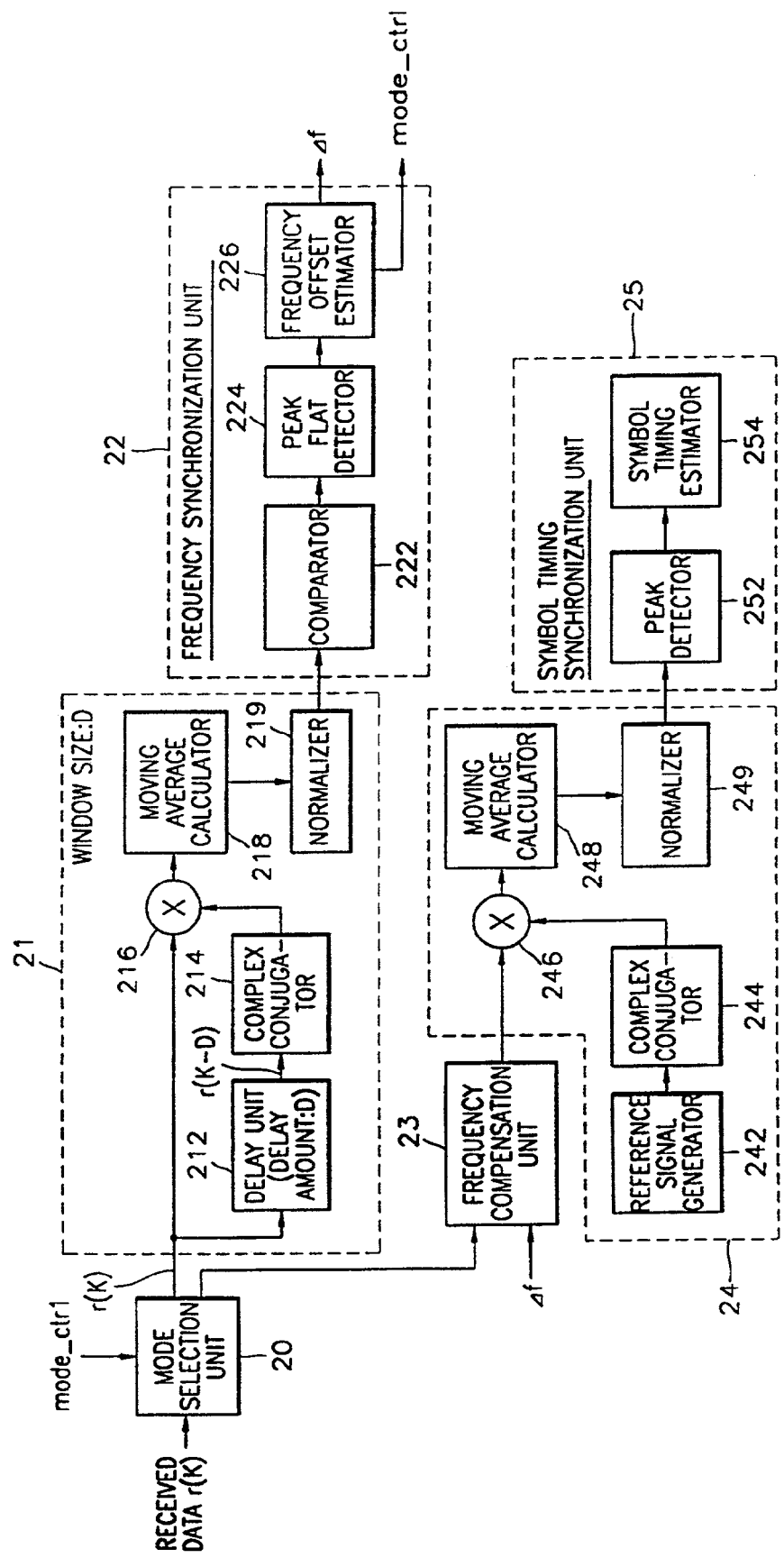
FIG. 2 is a block diagram of an apparatus for achieving symbol timing and frequency synchronization of OFDM signals according to an embodiment of the present invention.
Figure 3:
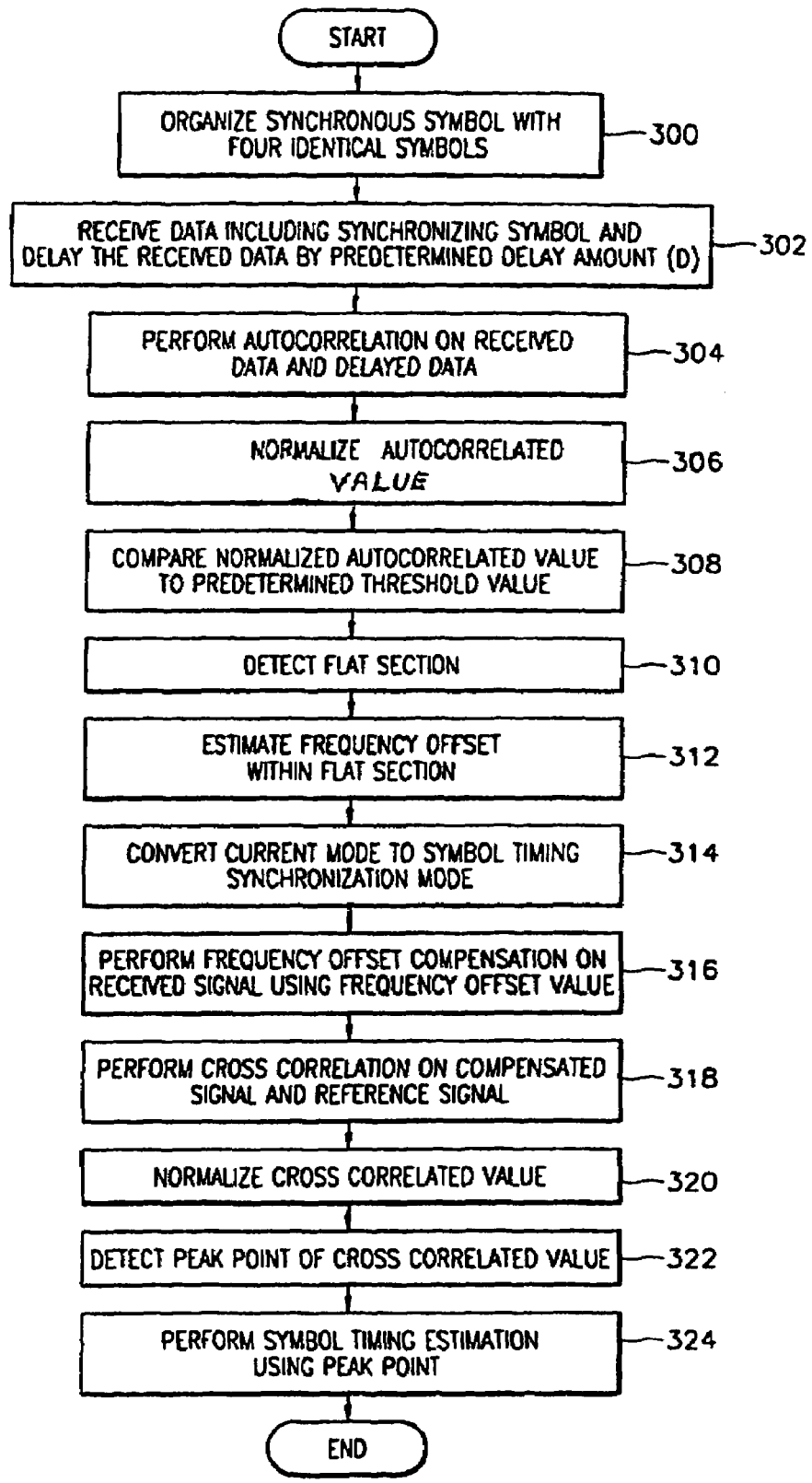
FIG. 3 is a flowchart illustrating a method of achieving symbol timing and frequency synchronization of OFDM signals according to an embodiment of the present invention.

Referring to FIG. 2, a method for achieving symbol timing and frequency synchronization to orthogonal frequency division multiplexed (OFDM) signals, according to an embodiment of the present invention, includes a mode selection unit 20, an autocorrelation unit 21, a frequency synchronization unit 22, a frequency offset compensation unit 23, a cross-correlation unit 24, and a symbol timing synchronization unit 25. The autocorrelation unit 21 includes a delay unit 212, a complex conjugator 214, a multiplier 216, a moving average calculator 218, and a normalizer 219. The frequency synchronization unit 22 includes a comparator 222, a peak flat detector 224, and a frequency offset estimator 226. The cross correlation unit 24 includes a reference signal generator 242, a complex conjugator 244, a multiplier 246, a moving average calculator 248, and a normalizer 249.

FIGS. 4A through 4C are views for illustrating the operation of an apparatus for achieving frequency and symbol timing synchronization of OFDM signals according to the present invention, and a frequency and symbol timing synchronization method according to the present invention. This apparatus receives an OFDM signal. The OFDM signal is made up of preamble data and payload data. The preamble data include an AGC symbol and a synchronizing symbol. The synchronizing symbol used in this embodiment includes four identical symbols SYNC_A as shown in FIG. 4A. That is, in this embodiment, a synchronizing symbol is made up of four symbols each having a length of 32 samples, which is half the length, 64 samples, of an OFDM symbol, in step 300. It is assumed that an OFDM signal having this synchronizing symbol is received. Preferably, the length of the synchronizing symbol is half the length of an OFDM symbol.

The mode selection unit 20 first selects a frequency synchronization mode. The delay unit 212 delays received data r(K) by a predetermined delay amount (D) which corresponds to the length, 32 samples, of each symbol used during synchronization, in step 302. The complex conjugator 214 complex-conjugates delayed data r(K−D). The multiplier 216 multiplies the received data r(K) by the delayed data r(K−D), and the moving average calculator 218 calculates a moving average. Here, the size of a window for the moving average corresponds to the delay amount (D), that is, 32 samples. As described above, the multiplier 216 and the moving average calculator 218 perform autocorrelation, in step 304, and output an autocorrelated value. Next, the normalizer 219 normalizes the autocorrelated value, in step 306. Consequently, the autocorrelation unit 21 outputs a normalized autocorrelated value.

The comparator 222 compares the normalized autocorrelated value to a predetermined threshold value, in step 308. The peak flat detector 224 detects a section where the normalized autocorrelated value is equal to or greater than the threshold value, as a flat section as shown in FIG. 4B, in step 310. The peak flat detector 224 can detect as a flat section a section where the difference or ratio between the autocorrelated value and the threshold value is greater than a predetermined value. Alternatively, the peak flat detector 224 can detect as the flat section a section having a predetermined sample length after a point where the auto-correlated value is greater than the threshold value. Also, alternatively, the peak flat detector 224 can be made up of an addition unit (not shown) and a flat section detection unit (not shown). The addition unit calculates the sum of a predetermined number of samples after a point where the autocorrelated value is greater than the threshold value. The flat section detection unit (not shown) detects a section where the difference or ratio between the sum and the threshold value is greater than a predetermined value.

The frequency offset estimator 226 estimates a frequency offset within the flat section to obtain a frequency offset value, in step 312. Here, frequency offset estimation can be performed at an arbitrary point within the flat section, so that it allows an error of about ±16 samples. The frequency offset estimator 226 also outputs a mode control signal mode_ctrl received by the mode selection unit 20, when estimation of a frequency offset value is completed. In this way, the frequency synchronization unit 22 obtains a frequency offset value by estimating a frequency offset within a flat section.

Alternatively, the frequency offset estimator 226 can be made up of a frequency offset calculation unit (not shown)m and an averaging unit (not shown). The frequency offset calculation unit calculates a plurality of frequency offset values within a flat section two or more times. The averaging unit obtains an averaged frequency offset value by calculating the average of the plurality of frequency offset values, and outputs the averaged frequency offset value as a final frequency offset value.

Following this, the mode selection unit 20 concludes the frequency synchronization mode in response to the mode control signal and selects a symbol timing synchronization mode.

The frequency offset compensation unit 23 performs frequency offset compensation on a received signal using the final frequency offset value obtained by the frequency synchronization unit 22.

The reference signal generator 242 generates and outputs a reference signal, and the complex conjugator 244 complex-conjugates the reference signal. The multiplier 246 multiplies the complex-conjugated reference signal by the frequency offset-compensated signal output from the frequency compensator 23, and the moving average calculator 248 calculates a moving average. That is, a cross correlated value is obtained by cross correlation performed by the multiplier 246 and the moving average calculator 248. The normalizer 249 normalizes the cross correlated value output from the moving average calculator. In this way, the cross correlation unit 24 performs cross correlation using the frequency offset-compensated signal and the reference signal and normalizes a cross correlated value, thereby outputting a normalized cross correlated value.

The symbol timing synchronization unit 25 detects a point where the cross correlated value is maximum, as shown in FIG. 4C. At this time, an accurate maximum point can be estimated since a received signal has been frequency-compensated. Thus, symbol timing estimation is performed using the accurately-estimated maximum point, thereby reducing symbol timing errors.

As described above, in the symbol timing and frequency synchronization apparatus and method according to the present invention, frequency synchronization and symbol timing synchronization are sequentially performed, and an error of about ±16 samples is allowed. That is, a large sample error can be allowed, so that accurate frequency synchronization can be achieved. Also, symbol timing estimation is performed using an accurately-estimated maximum point, thereby reducing a symbol timing error.

As described above, in the symbol timing and frequency synchronization apparatus and method according to the present invention, accurate frequency synchronization can be achieved because relatively large sample error can be allowed. Also, a symbol timing error can be reduced since symbol timing synchronization is achieved using a frequency offset-compensated signal.

INDUSTRIAL APPLICABILITY

A symbol timing and frequency synchronization apparatus and method according to the present invention is suitable for a wideband wireless LAN which does not require a coarse frequency offset estimation, since a frequency offset that is smaller than a symbol spacing is defined.

What is claimed is:

1. A frequency and symbol timing synchronization apparatus for achieving frequency synchronization and symbol timing synchronization of an orthogonal frequency division multiplexed (OFDM) signal, the apparatus comprising:
    an autocorrelation unit for receiving data including a synchronizing symbol made up of at least three identical synchronizing signals, delaying the received data by a predetermined delay amount, performing autocorrelation between the received data and the delayed data, normalizing an autocorrelated value, and outputting a normalized autocorrelated value;
    a comparator for comparing the normalized autocorrelated value with a predetermined threshold value;
    a peak flat detector for detecting as a flat section a section where the normalized autocorrelated value is equal to or greater than the threshold value;
    a frequency offset estimator for estimating a frequency offset within the flat section to obtain a frequency offset value;
    a frequency offset compensation unit for compensating for the frequency offset of a received signal using the frequency offset value;
    a cross correlation unit for performing cross correlation using a frequency offset-compensated signal and a reference signal, and normalizing the cross-correlated value to output a normalized cross-correlated value; and
    a symbol timing synchronization unit for detecting a point where the cross-correlated value is maximum, and performing symbol timing estimation, thereby performing symbol timing synchronization.

2. The frequency and symbol timing synchronization apparatus of claim 1, further comprising a mode selection unit for concluding a frequency synchronization mode and selecting a symbol timing synchronization mode.

3. The frequency and symbol timing synchronization apparatus of claim 1 or 2, wherein the length of the synchronous signal is equal to or less than the length of an OFDM half-symbol.

4. The frequency and symbol timing synchronization apparatus of claim 1, wherein the peak flat detector calculates the difference or ratio of the autocorrelated value and the threshold value and detects as a flat section a section where the difference or ratio is equal to or greater than a predetermined value.

5. The frequency and symbol timing synchronization apparatus of claim 1, wherein the peak flat detector detects as a flat section a section of a predetermined sample length after a point where the autocorrelated value is greater than the threshold value.

6. The frequency and symbol timing synchronization apparatus of claim 1, wherein the peak flat detector comprises:
    an addition unit for calculating the sum of a predetermined number of samples after a point where the auto-correlated value is greater than or equal to the threshold value; and
    a flat section detection unit for calculating the difference or ratio of the sum and the threshold value and detecting as a flat section a section where the difference or ratio is greater than or equal to a predetermined value.

7. The frequency and symbol timing synchronization apparatus of claim 1, wherein the frequency offset estimator comprises:
    a frequency offset estimation unit for obtaining frequency offset values by estimating a frequency offset within the section two or more times; and
    an averaging unit for calculating the average of the obtained frequency offset values to obtain an average frequency offset value.

8. A frequency and symbol timing synchronization method for achieving frequency synchronization and symbol timing synchronization of an orthogonal frequency division multiplexed (OFDM) signal, the method comprising:

(a) organizing a synchronizing symbol with at least three identical synchronous signals;
(b) receiving a signal including the synchronizing symbol, delaying the received signal by a predetermined delay amount, performing autocorrelation between the received signal and the delayed signal, normalizing an autocorrelated value, and detecting as a flat section a section where the normalized autocorrelated value is greater than a predetermined threshold value;
(c) estimating a frequency offset within the flat section to obtain a frequency offset value;
(d) compensating for the frequency offset of the received signal using the frequency offset value;
(e) performing symbol timing synchronization using a frequency offset-compensated signal and a reference signal.

9. The frequency and symbol timing synchronization method of claim 8, further comprising the step of concluding a frequency synchronization mode and selecting a symbol timing synchronization mode.

10. The frequency and symbol timing synchronization method of claim 8 or 9, wherein the length of the synchronous signal is equal to or less than the length of an OFDM half-symbol.

11. The frequency and symbol timing synchronization method of claim 8, wherein in the step (b), the difference or ratio of the autocorrelated value and the threshold value is calculated, and a section where the difference or ratio is equal to or greater than a predetermined value is detected as a flat section.

12. The frequency and symbol timing synchronization method of claim 8, wherein in the step (b), a section of a predetermined sample length after a point where the auto-correlated value is greater than the threshold value, is detected as a flat section.

13. The frequency and symbol timing synchronization method of claim 8, wherein the step (b) comprises:
calculating the sum of a predetermined number of samples after a point where the auto-correlated value is greater than or equal to the threshold value; and
calculating the difference or ratio of the sum and the threshold value and detecting as a flat section a section where the difference or ratio is greater than or equal to a predetermined value.

14. The frequency and symbol timing synchronization method of claim 8, wherein the step (c) comprises:
estimating a frequency offset within the flat section two or more times; and
calculating the average of the obtained frequency offset-estimated values to obtain an average frequency offset value.

* * * * *